(12) United States Patent
Davidson et al.

(10) Patent No.: US 6,246,693 B1
(45) Date of Patent: Jun. 12, 2001

(54) ONE-WAY PACKET COMMUNICATION CHANNEL WITH RETRANSMISSIONS

(75) Inventors: Boris Davidson, Forest Hills, NY (US); Charles W. Bostian, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 09/236,004

(22) Filed: Jan. 22, 1999

Related U.S. Application Data

(60) Provisional application No. 60/114,469, filed on Dec. 30, 1998.

(51) Int. Cl.[7] .................................................. H04L 12/413
(52) U.S. Cl. ............................................................. 370/445
(58) Field of Search ..................................... 370/349, 310, 370/328, 338, 392, 399, 400, 473, 445, 447, 462, 448

(56) References Cited

U.S. PATENT DOCUMENTS

| | | | |
|---|---|---|---|
| 4,554,656 | * | 11/1985 | Budrikis et al. ........................ 370/85 |
| 4,987,571 | * | 1/1991 | Haymond et al. .................... 370/445 |
| 5,712,860 | * | 1/1998 | Hardin ................................. 714/748 |
| 5,784,362 | * | 7/1998 | Turina .................................. 370/321 |
| 5,854,787 | * | 12/1998 | Dodge et al. ......................... 370/349 |
| 6,026,150 | * | 2/2000 | Frank et al. ....................... 379/90.01 |

OTHER PUBLICATIONS

J. Tilki et al; Encoding a Hidden Digital Signature onto an Audio Signal Using Psychoacoustic Masking; 7th Intl conf. on Signal Processing Applns & Tech, Boston, Ma; pp. 476–480, 7–10.

* cited by examiner

*Primary Examiner*—Huy D. Vu
*Assistant Examiner*—Alexander Boakye
(74) *Attorney, Agent, or Firm*—McGuireWoods LLP

(57) ABSTRACT

A random access technique for one way channels. With the apparatus and method of this system, each user sends an initial message of stated length to a central receiver. The message is then retransmitted a specified number of times in a pre-determined interval reserved for the retransmission process. The time interval between each successive retransmission of a given message is randomly generated. The random access protocol with retransmissions improves the probability of successful message transmission in a one way communication environment where observation (retransmission) periods for all users do not overlap.

36 Claims, 7 Drawing Sheets

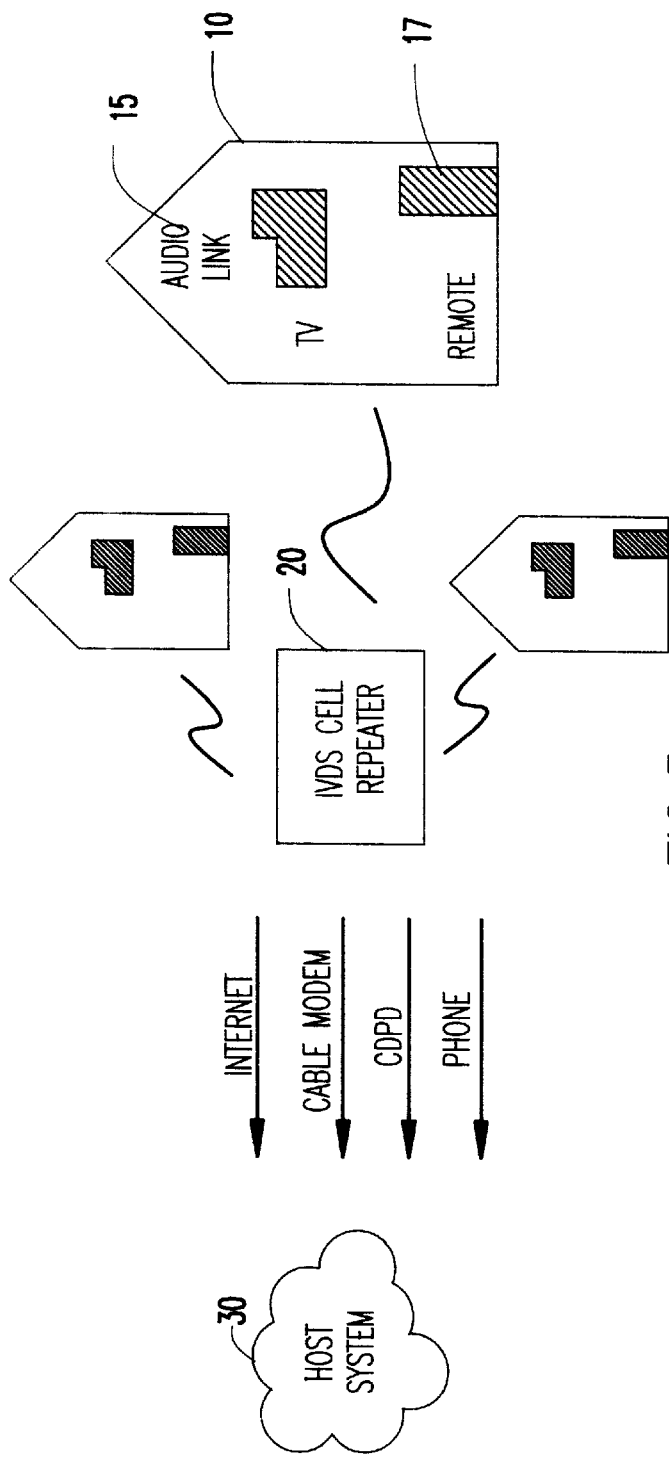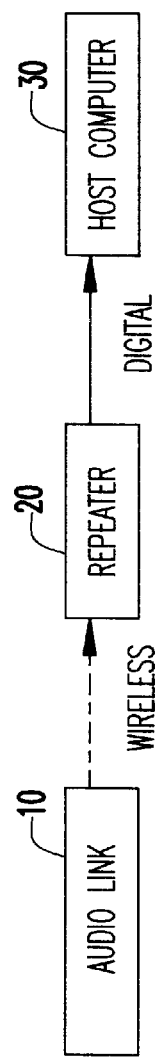
FIG. 5
FIG. 6

ONE-WAY PACKET COMMUNICATION CHANNEL WITH RETRANSMISSIONS

This application claims benefit of Provisional Appln 60/114,469 filed Dec. 30, 1998.

BACKGROUND OF THE INVENTION

1. Field of the Invention

The present invention generally relates to an apparatus and method for transmitting messages in a one-way communication system and, more particularly, to an apparatus and method for transmitting and randomly retransmitting multiple messages over a single channel in order to insure that at least one copy of each message is successfully transmitted.

2 Background Description

The need for multiple access strategies arises whenever a number of users have to share a single communication resource. This problem arises because it is either cost prohibitive or impractical to dedicate a communication channel to a particular user. Many such algorithms have been proposed and implemented for data transmissions in such a communication system. These algorithms can be classified into three categories including deterministic access, controlled access and random access.

The most common example of deterministic access is time-division multiplexing (TDM), where a portion of the outgoing time frame is allocated to each user TDM technique has been successfully implemented in, among others, geostationary satellite channels.

With controlled access, the users gain access to the channel either through a central controller (polling) or by passing control from one user to another in a decentralized fashion (token passing). These techniques are often used on a microwave channel where all users transmit on the same frequency.

Random access techniques allow users to transmit at will. These techniques employ various methods to resolve collisions that occur whenever two or more users transmit at the same time. One of the more common random access strategies is the ALOHA algorithm which resolves packet collision by having a central station recognize a collision and request the user to retransmit the message. This process is repeated until no collision or a given message is detected. The ALOHA transmission algorithm has been implemented in computer communication networks operating in a local-area network (LAN) environment.

All of the major access strategies discussed been used primarily in two-way (duplex) channels. In other words, some sort of acknowledgment is used to tell the user about the status of the transmission. However, many applications exist where unidirectional (simplex) transmissions could possibly meet all or most of the systems requirements, making the use of access strategies like the ALOHA algorithm both inefficient and expensive. These applications include, for example, home-shopping networks, video-on-demand controllers, and various alarm systems. The major problem that exists with simplex transmissions is that the transmitting party has no way of knowing whether the message was successfully received by a receiving station. Therefore, it is imperative for a system designer to develop a transmission scheme which would provide for a highly reliable message transfer in a one-way communication environment.

The problem of developing a traffic model for a unidirectional channel has been of interest to researchers for a number of years. One such model was investigated by Massey and Mathys, "The Collision Channel Without Feedback", which was developed for a situation where all users share a common communication resource but, because of the inability to synchronize their clocks, cannot transmit their data packets in a time-sharing mode. Additionally, due to the lack of a feedback link, they can never be sure of their individual packet transmission outcomes. This inability of users to synchronize transmissions forces them to employ random accessing. The model proposed in Massey and Mathys requires each user to have a protocol signal generator allowing them to transmit packets only during a time period determined by this generator to reduce packet collisions.

The scheme proposed by Massey and Mathys is not well suited to applications such as a home-shopping networks, for example, where each user needs to be able to initiate a transmission at any given time. In addition, most of these applications require a higher probability of successful message transmission than would be possible with a single transmission in cases of anything other than an extremely lightly loaded channel (e.g., a channel with low message arrival rate). One of the ways to improve the probability of successful message transmission is to introduce stochastically distributed message retransmissions into the channel protocol, for which no provision was made by the channel model in Massey and Mathys.

Another model for a collision channel without feedback was considered over twenty years ago by Huber and Shah, "Simple Asynchronous Multiplex Systems for Unidirectional Low-Data-Rate Transmission". Huber and Shah looked at a system consisting of many peripheral transmitters and a single central receiver with unidirectional information flow. The transmitters would send short messages consisting of their own addresses and a small number of additional information bits. The transmitters had no way of recognizing whether the channel was busy or not, and they were totally independent of each other. The information flow would be carried over a single binary channel consisting of a radio link. Huber and Shah investigated the transmitter repetition rate that should be selected for ensuring a maximum of correctly received messages, the effect of the average transmission rate on the behavior of the system, and the optimal strategy that each individual station should use when transmitting the message. Huber and Shah determined the number of transmissions for maximum data flow, as well as the probability that a message would be received correctly under optimum conditions. Finally, they postulated that some form of stochastic message distribution by each individual station was necessary in order to improve system performance.

It is worth noting that Huber and Shah were primarily concerned with determining the optimal average transmission rate which would maximize the (expected) total number of correctly received messages from all users during some observation period (which they considered to be the time interval during which all system users executed their transmission attempts). Huber and Shah made no attempt to develop quantitatively a retransmission strategy which would improve the chances of each user having at least one message received correctly when the observation period for that user does not perfectly coincide with the observation periods for all other users.

SUMMARY OF THE INVENTION

It is an object of the present invention to provide a simplex communication system that minimizes or avoids message collisions between multiple messages.

It is a further object of the present invention to provide a simplex communication system that ensures that at least one copy of each message is successfully transmitted.

According to the invention, there is provided a method for avoiding signal collision of messages transmitted over a single channel. In preferred embodiments, the method includes transmitting and randomly retransmitting messages over a single channel. In order to predict the error rate and thus ensure that collisions between messages are avoided, the method the present invention further determines a retransmission interval between the retransmitted messages, as well as a message arrival rate and message length of the messages. The error rate is thus determined as a function of the message length and rate, and the retransmission interval and number of retransmissions of the messages.

In further embodiments, the method of the present invention determines the subintervals of an end of an original message transmission of each message and an end of a final randomly retransmitted message so that each retransmission occurs at any time within a respective subinterval. A new message retransmission will not occur prior to a start of a next subinterval. It is further contemplated that a fixed value for the message length and the retransmission interval are determined in order to determine the optimal number of retransmissions for all arrival rates of each of the messages on the single channel.

In further embodiments, the messages are transmitted via (i) Internet, (ii) cable modem, (iii) CDPD or (iv) phone, and are responsive to a hidden code placed in an audio portion of a television message. All corrupted messages are disregarded and the remaining messages contain ordering information responsive to the television message. The messages also include other data streams which may include a start of the message and other command functions and priority levels.

The present invention further includes an apparatus for avoiding message collision. The apparatus includes a decoder, a repeater and a host system. In preferred embodiments, a television advertisers provides a "hidden" code over an audio portion of a television signal. A user responds to the code so as to order services and/or merchandise. In order to accomplish this, the television user provides a digital signal appended to the audio signal and the system of the present invention ensures that the digital signal is received by the host system. The digital signal may be provided on four frequencies and is decoded and retransmitted until receipt of the message is successful. Other hardware is also provided by the present system, such as microprocessors, decoders, data structures and the like which are discussed in detail with reference to the drawings provided herein.

BRIEF DESCRIPTION OF THE DRAWINGS

The foregoing and other objects, aspects and advantages will be better understood from the following detailed description of a preferred embodiment of the invention with reference to the drawings, in which:

FIG. 5 shows a system overview of an example of the present invention;

FIG. 6 shows a functional diagram of a repeater and related systems of the present invention;

DETAILED DESCRIPTION OF A PREFERRED EMBODIMENT OF THE INVENTION

Figure 1:
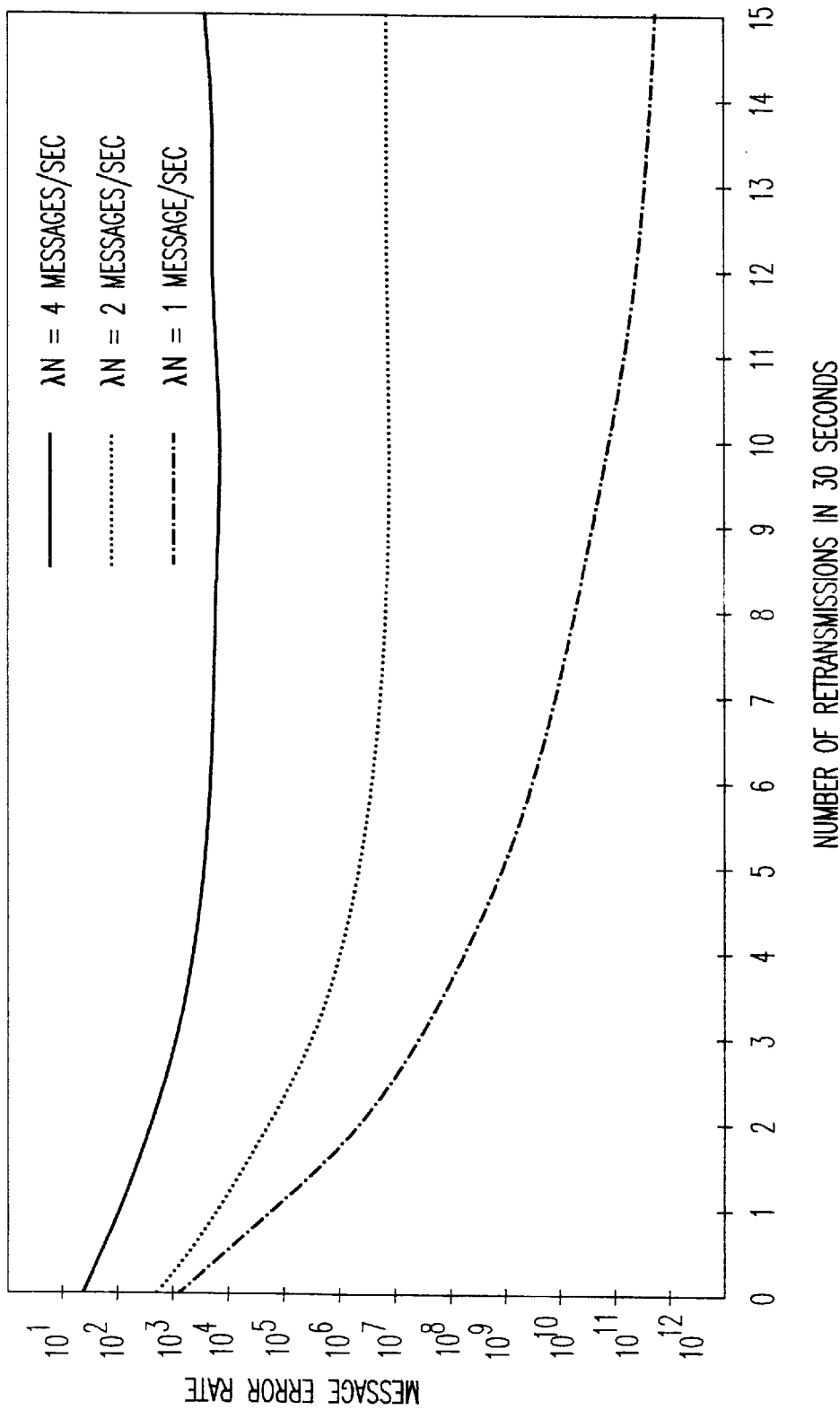
FIG. 1 is a graph of MER versus number of retransmissions for message rates equal to 4 messages/sec., 2 messages/sec. and 1 message/sec.

A random access method and apparatus for simplex channels is presented herein such that users transmit messages over a wireless channel until the message is successfully received by a receiving station. Specifically, the present invention is directed to a method and apparatus for a one-way communication system having a multiple access algorithm which enables a plurality of transmitters to transmit messages over a single channel to a single receiver while alleviating message collisions.

The disclosed invention ensures receipt of the transmission by initially transmitting the transmission and then randomly retransmitting the transmission a number of times until the receiving station successfully receives the transmissions. In further preferred embodiments, the communication system operates as a true simplex communication system (e.g., no verification of transmission receipt is used). Further, although the developed technique and method assumes no message buffering at a central receiver, one of ordinary skill in the art can easily implement buffering in order to provide further improvement in the overall channel throughput of the present invention.

In preferred embodiments, the apparatus and method of use of the present invention is used to request a product in response to a television advertisement. For illustrative purposes only, the discussion relating to the method and apparatus of the present invention will be discussed with reference to responding to television advertisements; however, the method and apparatus of the present invention may be equally used with other systems, such as, for example, radio, video-on-demand controllers, games, and alarm systems, etc.

It is clear that one cannot predict when any given system user will originate a message transmission on a channel under consideration. This is because the message can be in response to any television program or other message that is broadcast during a single day or defined time period. Moreover, once that message is transmitted, its subsequent retransmissions can be structured in any given manner. Therefore, the statistics for the generation of initial messages and subsequent retransmissions will differ. Also, the arrival of initial messages at the central station obeys Poissons statistics, which serves as a good approximation in modeling the arrival of a large number of messages from totally uncorrelated sources. The total initial message arrival rate is thus described by the parameter $\lambda N$ (in messages/sec.), where $\lambda$ is the average rate of initial messages transmitted per user and N is the total number of users on the system. Thus, the probability p(k) of k original (Poisson) arrives in the time interval t given by $$p(k) = e^{-\lambda Nt} \frac{(\lambda Nt)^k}{k!}. \quad (1)$$

Expression (1) represents the probability density function (pdf) of a Poisson distribution. It is important to note that the arrival of initial messages at the central station with the proposed channel will in fact satisfy the major requirements for a Poisson process, particularly that the arrivals are memoryless and an arrival on one time interval of length "t" is independent of arrivals in previous or future intervals. In other words, if a user has responded to a given television advertisement, for example, the user is no more or less likely to respond to such future advertisements.

Generation of Retransmissions

Upon completion of the initial message transmission, users will enter their retransmission period. It is during this time interval that all retransmissions of each user's initial message will take place. As was stated in Huber and Shah, periodic repetition of the same message cannot be employed since using identical periods for all transmitters would mean that any coincidence which might occur would be repeated again and again. This would cause all transmitted messages to suffer collisions. Thus, using different periods for different transmitters provides an advantage to the transmitters with the shortest periods, which is generally not desired for transmission of messages. Therefore, a stochastic distribution of message transmissions is necessary.

Specifically, the time interval T from the end of an original message transmission to the end of its final retransmission will be broken into E identical subintervals, since there are E such retransmissions. Each retransmission can occur at any time within its respective subinterval. However, if a retransmission is completed prior to the end of this subinterval, a new retransmission will not be allowed to occur before the start of the next subinterval. Since each message is $\tau$ seconds in duration, the maximum time interval between successive retransmissions is given by (T/E)-$\tau$.

This time interval between successive retransmissions for any user can be modeled as a uniformly distributed random variable on the interval [0, T/E-$\tau$]. Therefore, each retransmission delay has a probability density function f(t) given by:

$$f(t) = \begin{cases} \dfrac{1}{\dfrac{T}{E} - \tau} & \text{for } 0 < t < (T/E) - \tau \\ 0 & \text{otherwise} \end{cases} \quad (2)$$

Uniform distribution of retransmissions was selected for a number of reasons. First of all, uniformly distributed events can be easily implemented in practice using random number generator circuits. Secondly, uniform message distribution produces significantly better results than other common techniques, namely, exponential distribution of the time intervals between the messages.

Having outlined the criteria for initial message transmissions and retransmissions by each user with the proposed channel, message collision process can now be addressed. The probability of a successful transmission of a given message, denoted P, is the probability that at least one of (E+1) transmissions of that message is successful (e.g., transmitted without collision with any other messages), where E is again the number of retransmissions for each message. This can be expressed as follows:

$$P = 1 - P \text{ \{all } (E+1) \text{ transmissions of a given message suffered a collision\}} = 1 - P_1 \quad (3)$$

with $$P_1 = P \text{ \{original transmission failed\}} \times P \text{\{all retransmissions failed\}}. \quad (4)$$

A transmission by a given user can collide with either an original transmission or a retransmission from any other user. As previously discussed, the statistics for the generation of original transmissions and subsequent retransmissions differ. However, every transmission encounters identical conditions on the channel. In other words, the message generation processes for all users do not vary with time. Therefore, $$P \text{ \{original transmissions failed\}} = P \text{ \{any one of E retransmissions failed\}}. \quad (5)$$

and $$P\text{\{all transmissions failed\}} = [P\text{\{any one of E transmissions failed\}}]^E. \quad (6)$$

Thus, the term $P_1$ (the probability that all E+1 transmissions of a given message suffered a collision) can be expressed as:

$$P_1 = P_2^{E+1} \quad (7)$$

where $P_2$ represents the probability that a collision occurred. In the subsequent analysis, only the worst case scenario (one that will maximize $P_2$) is considered.

Specifically, every message sent by the user of interest, creates a "collision window" of fixed duration equal to 2$\tau$. If any other message arrives at the receiver during this period, a collision will take place. The probability that initial messages are present on the channel during 2$\tau$ is the probability that at least one Poisson arrival occurred in 2$\tau$ and it is given by:

$$P\{\text{at least one arrival in } 2\tau\} = 1 - e^{-2\lambda N\tau} \quad (8)$$

From the standpoint of collisions, all Poisson messages have equal probability of suffering a collision with some given message. This probability depends only on the message length and on the number of messages generated per unit of time. This implies that any Poisson message is equally likely to undergo a collision with a given message. Hence, in this case, Poisson message distribution reduces uniformly from the collisional viewpoint.

Even though the arrival of initial messages obeys Poisson statistics, a pure Poisson process does not exist. Instead, Poisson-distributed initial messages trigger retransmissions for each user. In order to represent the probability of collision with original messages in this compound system, an effective collision parameter $\tau_{\text{eff}}$ is introduced. This allows one to treat, from a collisional dynamics point of view, the initial message generation and retransmission processes independently, although the retransmission process for each user is conditioned on an initial message having been transmitted. With this modification, the expression (8) for the probability of at least one initial message having been generated during the collision window is given by:

$$P \{\text{at least one initial message generated during the collision window}\} = 1 - e^{-2\lambda N\tau_{\textit{eff}}} \quad (9)$$

When a given user transmits a message, there are three possible combinations of messages from all other users that can be present on the channel during the interval $2\tau$ (and therefore cause a collision):

1. There can be only initial messages from other users and no retransmissions on the channel during $2\tau$ (the probability of which will be denoted $P_3$).
2. There can be only retransmissions from other users and no initial messages on the channel during $2\tau$ (the probability of which will be denoted $P_4$).
3. The channel can contain both initial messages and retransmissions during this interval of time (the probability of which will be denoted $P_5$).

Therefore, the probability of collision $P_2$ can be expressed as the sum of the above probabilities as follows:

$$P_2 = P_3 + P_4 + P_5 \quad (10)$$

In order to determine the expression for $P_3$ (10), the problem of retransmitted message collisions must be considered. There are two situations that will prevent retransmissions from being on the channel during $2\tau$.

1. None of the users sent an initial message during a specified interval of time (T) before $2\tau$ (and therefore could not possibly send a retransmission during $2\tau$), or
2. None of the users eligible to send a retransmission during $2\tau$ (that is, those who sent an initial message during T before $2\tau$) did so.

The probability of the first case occurring is given by $e^{-\lambda N\tau}$ (the probability of no Poisson arrivals in T). Since the retransmission interval for each user is uniformly distributed, the probability that any one user who is eligible to retransmit did not do so during $2\tau$ is expressed as:

$$\int_{2\tau}^{(T/E)-\tau} \frac{1}{(T/E) - \tau} dt = 1 - \frac{2E\tau}{T - E\tau}. \quad (11)$$

Expression (11) is the probability that the retransmission was originated somewhere else in the interval $(T/E)-\tau$ reserved for each retransmission, and not during $2\tau$. Thus, the probability of the second scenario (e.g., the case where none of the users who sent an initial message during T retransmitted their messages during $2\tau$) is given by:

$$(1 - e^{-\lambda N}) \times \left(1 - \frac{2E\tau}{T - E\tau}\right)^E.$$

The exponent E in the previous expression arises because each user has E possible retransmissions for any given message. Putting together all of the above yields the expression for $P_3$ in (10):

$$P_3 = (1 - e_{\textit{eff}}^{-2\lambda N\tau}) \times \left[e^{-\lambda NT} + (1 - e^{-\lambda NT})\left(\frac{1 - 2E\tau}{T - E\tau}\right)^E\right] \quad (12)$$

Next, the expression for probability $P_4$ in expression (10) is derived. That is, the probability that only retransmissions from other users and no initial messages are present on the channel during the interval $2\tau$, thereby causing collisions with the message or interest. In order for retransmissions to be present on the channel during the collision window, at least one user must send an original message during T and retransmit that message during $2\tau$. The probability of that scenario occurring is given by $$(1 - e^{-\lambda NT})\left(1 - \left(\frac{1 - 2E\tau}{T - E\tau}\right)^E\right).$$

By multiply this expression by the probability $e^{-\lambda N\tau_{\textit{eff}}}$ that no initial messages are present on the channel during the collision window, the final expression for $P_4$ is:

$$P_4 = (1 - e^{-\lambda NT})\left(1 - \left(\frac{1 - 2E\tau}{T - E\tau}\right)^E\right) e_{\textit{eff}}^{-\lambda N\tau} \quad (13)$$

Finally, the expression for $P_5$ in expression (10), which is the probability of the channel containing both original messages and retransmissions during the collision window, must be determined. This expression is similar to expression (13) and is given by:

$$P_5 = (1 - e^{-\lambda NT})\left(1 - \left(\frac{1 - 2E\tau}{T - E\tau}\right)^E\right)(1 - e^{-2\lambda N\tau_{\textit{eff}}}) \quad (14)$$

Using expressions (12), (13) and (14) in expression (10) and simplifying, yields the final expression for the probability of collision $P_2$:

$$P_2 = (1 - e^{-2\lambda N\tau_{\textit{eff}}}) + (1 - e^{-\lambda NT}) \times \quad (15)$$

$$\left(1 - \left(\frac{1 - 2E\tau}{T - E\tau}\right)^E\right) e^{-2\lambda N\tau_{\textit{eff}}}.$$

Using expression (15) in expression (7) leads to the expression for the probability $P_1$ that a given message was not transmitted successfully:

$$P_1 = \left[(1 - e^{-2\lambda N\tau_{\textit{eff}}}) + (1 - e^{-\lambda NT}) \times \right. \quad (16)$$

$$\left. \left(1 - \left(\frac{1 - 2E\tau}{T - E\tau}\right)^E\right) e^{-2\lambda N\tau_{\textit{eff}}}\right]^{E+1}.$$

Finally, using the expression (16) in expression (3) gives the expression for the probability of successful transmission of a message using the algorithm of the present invention:

$$P = 1 - \left[(1 - e^{-2\lambda N^{\tau}_{\textit{eff}}}) + (1 - e^{-\lambda NT}) \times \right. \quad (17)$$

$$\left. \left(1 - \left(\frac{1 - 2E\tau}{T - E\tau}\right)^E\right) e^{-2\lambda N^{\tau}_{\textit{eff}}}\right]^{E+1}.$$

The retransmission process for each user with using the present invention is conditioned on the origination of an initial message by that user. At any given instant in time, there may be users who are in their retransmission periods as well as users who are sending their initial transmission. Thus, concurrent interdependent processes occur on the channel (i.e., Poisson distributed initial message arrivals and uniformly distributed message retransmission). In order to analyze properly this compound system, an approach that would allow one to treat the initial message generation and retransmission processes independently is needed. The introduction of an effective collision parameter $\tau_{eff}$ is precisely that tool.

In order to determine the expression for $\tau_{eff}$, each message and all of its retransmissions are assumed to be Poisson distributed. In other words, if all (E+1) arrivals of every message followed Poisson statistics, the probability that no such arrivals would take place during the collision window is expressed by $e^{-2\lambda N(e+1)\tau}$. In actuality, the probability that no arrivals of an initial message and any retransmission occur during the collision interval is given by $$e^{-2\lambda N\tau_{eff}}\left[e^{-\lambda NT} + (1-e^{-\lambda NT})\left(1 - \frac{2E\tau}{T-E\tau}\right)\right].$$

Equating the last two expressions yields the formula for $\tau_{eff}$:

$$\tau_{eff} = (E+1)\tau + \frac{1}{2\lambda N}\ln\left[e^{-\lambda NT} + (1-e^{-\lambda NT})\left(1 - \frac{2E\tau}{T-E\tau}\right)\right]. \quad (18)$$

Therefore, in order to evaluate the expression (17) for the probability of successful message transmissions, one must first determine the effective collision parameter $\tau_{eff}$ using expression (18). Subsequently, that value should be substituted into expression (17).

As is seen above, the effective collision parameter $\tau_{eff}$ is given by expression (18). Thus, it contains two major terms, e.g., the first term, $(E+1)\tau$, arising from the introduction of retransmissions into the channel model, and the second term, $$\left(\frac{1}{2\lambda N}\right)\ln\left[e^{-\lambda NT} + (1-e^{-\lambda NT})\left(1 - \frac{2E\tau}{T-E\tau}\right)\right]$$

being the correction factor used to account for interdependency of initial message generation and message retransmission processes. The contributions of each of these two major terms in $\tau_{eff}$ are analyzed for the case of $\tau$=4.6 msec and T=30 sec (the same parameters are used to generate FIG. 1 discussed below).

Effect of Initial Arrival Rate on System Performance

Upon closer examination of expressions (17) and (18), it is clear that the probability of successful message transmission is a function of four major parameters, e.g., (i) the initial message arrival rate $\lambda N$, (ii) the message length $\tau$, (iii) the number of retransmissions E for each message, and (iv) the total retransmission interval T. A user developing a channel using the traffic model of the present invention would be able to select all of the above parameters with the exception of the initial message arrival rate. It is therefore imperative to study the channel behavior (message success probability) for various arrival rates.

Using some fixed values for the message length and the retransmission interval, the optimal number of retransmissions can be determined for all given arrival rates. This is accomplished by first calculating (using expression (18)) the effective collision parameter $\tau_{eff}$ for a given rate and the number of retransmissions. Then, this value is substituted into expression (17) to determine the probability of successful message transmission for a specified number of retransmissions and a given rate of initial message arrivals on that channel.

For illustrative purposes only, and to better understand the present invention, a channel behavior is analyzed for the case of $\tau$=4.6 msec (corresponding to a 184-bit message transmitted at 40 Kbits/sec) and T=30 sec. The system will incorporate 4 independent channels, serving approximately 100 users per channel, in a cell with radius of roughly 0.5 miles. These retransmission intervals are selected in order for users to respond to television advertisements lasting an average of 30 seconds, and are shown for illustrative purposes only. This implies that the message arrival rate will never exceed 4 messages per second. It is important to note that these parameters are used as examples and other parameters are equally contemplated for use by the present invention.

Referring now to the drawings, and more particularly to FIG. 1, the plots of the calculated message error rate (MER) versus the number of retransmissions on a semi-log scale for initial message arrival rates of 1, 2, and 4 messages/sec, respectively, is shown. MER is equal to $P_1$, where $P_1$ is defined in expression (16). These rates are selected because they fall in the range of expected arrival rates for the specified channel application. The primary goal is to achieve a required reliability of transmitting uncorrupted messages using a number of retransmissions.

Specifically, FIG. 1 illustrates several important points regarding the channel model of the present invention. First, the retransmission process significantly improves channel reliability compared to employing a single retransmission of each message. For example, given the initial message arrival rate of 4 messages/sec, the value of MER is approximately $2 \times 10^{-2}$ when the retransmission process is not employed. This value decreases to about $1 \times 10^{-5}$ when the retransmission process of the channel model of the present invention is utilized generating 10 retransmissions in 30 seconds The improvement is even more dramatic when the loading on the channel is lighter (e.g., when the initial message arrival rate is lower).

Second, if the heaviest expected initial message arrival rate is known, a user of the traffic model of the present invention can determine if the required channel reliability can be achieved for a given message length and retransmission interval. If this is possible, the minimum number of retransmissions necessary to achieve this reliability can also be determined. A maximum acceptable MER value of $1 \times 10^{-5}$ is often quoted for a communication channel. Then, as can be seen from FIG. 1, the message success probability with the scheme of the present invention will exceed the minimum required value ($1 \times 10^{-5}$) by using:

3 repetitions, if the initial message rate is equal to 1 message/sec.

4 repetitions, if the initial message rate is equal to 2 messages/sec., or 10 repetitions, if the initial message rate is equal to 4 messages/sec.

Determination of Channel Parameters

Figure 2:
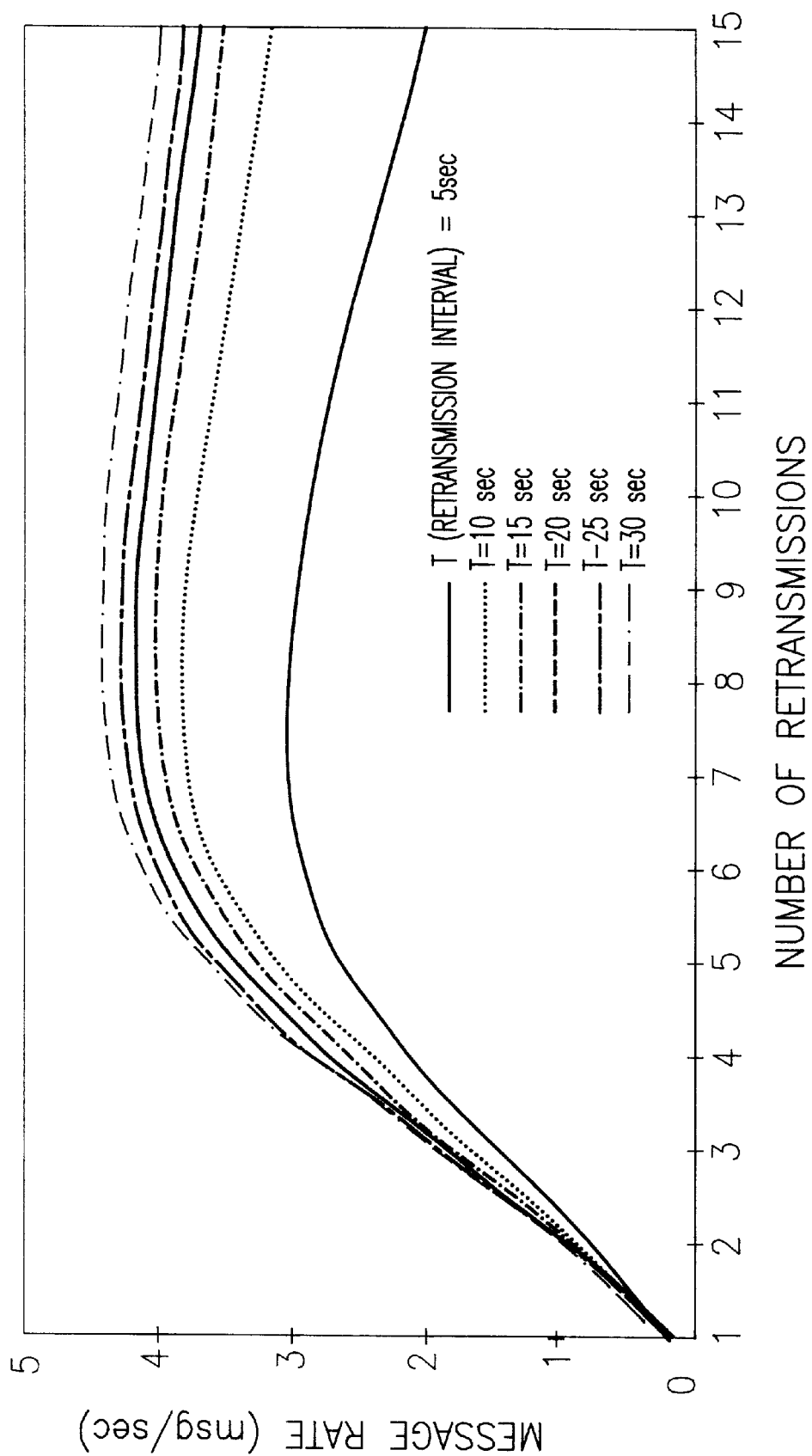
FIG. 2 is a graph of maximum throughput versus the number of retransmissions for a message error rate of less than $1 \times 10^{-5}$.

In the above analysis, it is assumed that the retransmission interval is given and the initial message arrival rate is known. Often, however, this is not the case. A model, based on expressions (16) and (18), is thus developed to calculate the maximum initial message arrival rate that a channel with a given retransmission interval and a number of retransmissions could support, in a preferred embodiment. Table 1 and FIG. 2 illustrate these results for message length of $\tau$=4.6 msec and MER of no greater than $1 \times 10^{-5}$. In other words, Table 1 shows an arrival rate of a number of retransmission over a given time period. For example, referring to Table 1, a maximum arrival rate is 4.1 new messages/second at a number of 15 retransmissions.

TABLE 1

| Number of Retransmission | Interval Retransmissions (Seconds) | | | | | |
|---|---|---|---|---|---|---|
| | 5 | 10 | 15 | 20 | 25 | 30 |
| 1 | 0.18 | 0.18 | 0.18 | 0.18 | 0.18 | 0.18 |
| 2 | 0.67 | 0.73 | 0.75 | 0.76 | 0.77 | 0.77 |
| 3 | 1.28 | 1.43 | 1.48 | 1.5 | 1.52 | 1.53 |
| 4 | 1.81 | 2.05 | 2.14 | 2.18 | 2.2 | 2.22 |
| 5 | 2.21 | 2.55 | 2.66 | 2.71 | 2.75 | 2.77 |
| 6 | 2.47 | 2.91 | 3.05 | 3.12 | 3.16 | 3.19 |
| 7 | 2.62 | 3.15 | 3.33 | 3.42 | 3.47 | 3.51 |
| 8 | 2.68 | 3.32 | 3.53 | 3.63 | 3.69 | 1.74 |
| 9 | 2.67 | 3.41 | 3.65 | 3.78 | 3.85 | 3.9 |
| 10 | 2.61 | 3.45 | 3.73 | 3.87 | 3.95 | 4.01 |
| 11 | 2.51 | 3.45 | 3.77 | 3.92 | 4.01 | 4.07 |
| 12 | 2.37 | 3.42 | 3.77 | 3.94 | 4.04 | 4.11 |
| 13 | 2.22 | 3.37 | 3.75 | 3.94 | 4.05 | 4.13 |
| 14 | 2.04 | 3.3 | 3.71 | 3.92 | 4.04 | 4.12 |
| 15 | 1.84 | 3.21 | 3.66 | 3.88 | 4.01 | 4.1 |

As the retransmission period is increased, the maximum throughput that can be supported by the channel also increases. However, lengthening the retransmission period has a progressively smaller effect on the throughput. In addition, the number of retransmissions required to achieve the maximum throughput for any given retransmission interval becomes progressively larger with the increased retransmission period. This is due to the fact that, for longer retransmission intervals, significantly more retransmission from all users are needed to saturate the channel. This effect is particularly pronounced when the retransmission period is 5 seconds. In this case, introducing more than the optimal number of retransmissions for each user quickly saturates the channel thus degrading its performance.

Computer Simulation of the Channel of the Present Invention

In order to validate the probabilistic traffic model presented above, a simulator for channel behavior is created in accordance with the present invention. The simulator generates messages for the channel and, for each message, its retransmissions. All of the traffic is analyzed for collisions and errors, and the results are compared to an analytical model. The simulator has three main parts, including message generation, retransmission generation and channel analysis. Message arrival times are generated using a Poisson distribution based on two parameters, e.g., the simulation duration (its run time) and average message density. The origination time of each message is determined by exponentially distributing inter-arrival times based on the average original message density. This approach has been shown to produce a Poisson arrival process (A. Papoulis, "Probability Random Variables, and Statistical Interference"). In addition, all original messages are assigned a unique integer to identify the messages.

The simulator's algorithm for generating retransmissions is as follows. First, the total retransmission period is divided by the number of retransmissions, yielding equal subintervals. Each retransmission occurs within its respective subinterval at a time determined using a random number generator. This yields a uniform distribution of message retransmission times. Each message retransmission has the same integer identification number as the original message. A collision occurs anytime a new message or retransmission begins while another message is still being transmitted. When this happens, both messages are lost. An error occurs if a message and all of its subsequent retransmissions experience collisions. The error probability is the number of errors divided by the number of original messages. If an error occurs, the message origination time is considered to be the time of the error. These times can then be examined to verify that errors occur with a reasonable distribution within the simulation duration.

Due to the nature of the simulation process, messages at the beginning and the end of the simulation period do not experience the same amount of traffic as those messages in the middle of the simulation period. In order to avoid simulation results being skewed by this, all messages originating within the retransmission period of the beginning and end of the simulation are ignored when computing collisions and errors.

The simulator places all generated messages into a list sorted by message generation time. Once all messages have been inserted in this list, the simulator analyzes message transmissions and retransmissions to find error and collision probabilities as well as the complete message loss (e.g., the probability that all E+1 transmissions of a given message suffered collisions) as a function of time.

Comparison of Simulated and Theoretical Results

In order to verify the validity of the closed-form solution for the MER derived above, computer simulation of the channel is performed in accordance with the above discussion. The parameters used for the simulation are identical to those used in FIG. 1 with the initial message arrival rate being 4 messages/sec.

Upon closer examination of the curve for $\lambda N=4$ messages/sec in FIG. 1, it is obvious that MER of less than 1 in 100,000 messages can be expected when the number of retransmissions is in the range of 10 to 15. Therefore, the total number of simulated messages has to be at least one order of magnitude greater than the minimum number required, or approximately 1,000,000 messages. Toward that end, the simulation is repeated 17 times as the number of retransmissions is varied from 1 to 15. Each time, approximately 60,000 new messages are generated for a total of about 1,020,000 such messages. For each number of retransmissions, any given simulation results in a proportion of a number of lost messages to total number of messages generated. Subsequently, the mean of all 17 proportions is calculated for each number of retransmissions.

Figure 3:
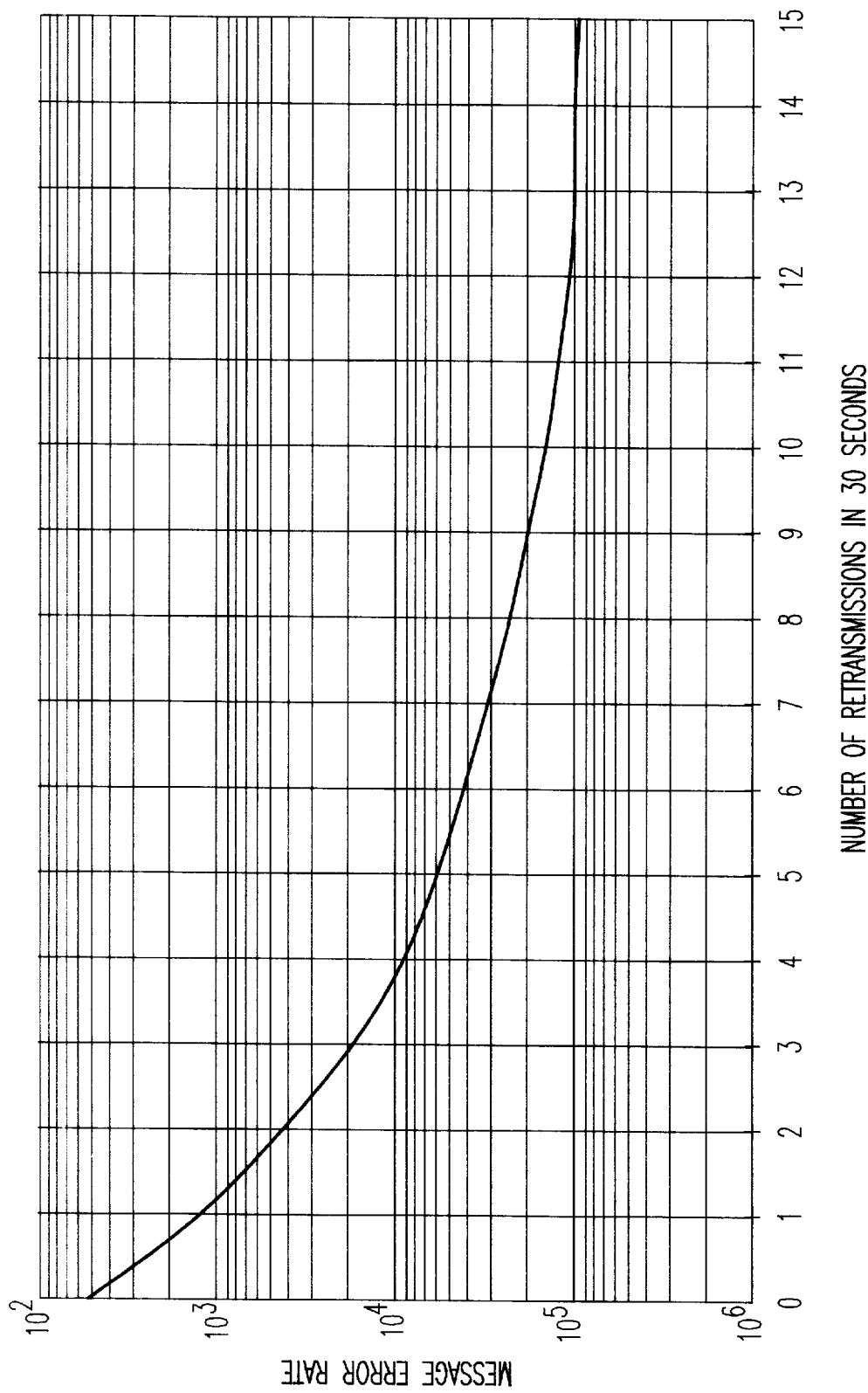
FIG. 3 is a graph of the calculated and simulated MER versus the number of retransmissions for arrival rate equal to 4 messages/sec.

FIG. 3 shows the comparison between the calculated MER values and the means of simulated results. FIG. 3 shows that there is acceptable agreement between theoretical and simulated results. Note that the simulated MER is never greater than its corresponding theoretical value. In other words, the theoretical model never underestimates the MER value for any given number of retransmissions which is of particular importance to a system designer implementing such a traffic model.

A sample of 17 MER values and estimate the 95% confidence interval for mean MER is provided. A SAS (Statistical Analysis Software) module generated 1000 bootstrap samples (each having 17 values) for any given number of retransmissions. A bootstrap estimate of mean MER for each of 1000 samples is calculated and the smallest interval containing 950 consecutively ordered bootstrapped mean MER estimates, which then becomes the 95% confidence interval is determined. Table 2 shows the summary of the results, where it contains for each number of retransmissions from 1 to 15 the theoretical MER value based on expression (2–16), the mean simulated MER value, and the upper and lower limits of the bootstrapped 95% confidence interval.

TABLE 2

| # of Retransmissions | Theoretical MER | Mean Simulated MER | Bootstrapped 95% Confidence | |
|---|---|---|---|---|
| | | | Low | Upper |
| 1 | 5.035 E-3 | 4.806 E-3 | 4.716 E-3 | 4.907 E-3 |
| 2 | 1.16 E-3 | 1.52 E-3 | 1.086 E-3 | 1.221 E-3 |
| 3 | 3.676 E-4 | 3.352 E-3 | 2.997 E-4 | 3.696 E-4 |
| 4 | 1.467 E-5 | 1.417 E-4 | 1.279 E-4 | 1.574 E-4 |
| 5 | 700 E-5 | 6.606 E-4 | 5.41 E-5 | 7.89 E-5 |
| 6 | 3863 E-5 | 2.758 E-5 | 2.16 E-5 | 3.65 E-5 |
| 7 | 2.401 E-5 | 1.674 E-5 | 9.827 E-6 | 2.46 E-5 |
| 8 | 1.651 E-5 | 8.867 E-5 | 4.913 E-6 | 1.47 E-5 |
| 9 | 1.237 E-5 | 1.083 E-6 | 6.883 E-6 | 1.57 E-5 |
| 10 | 9.996 E-6 | 6.902 E-5 | 2.947 E-6 | 1.18 E-5 |
| 11 | 8.616 E-6 | 4.942 E-6 | 9.91 E-7 | 9.883 E-6 |
| 12 | 7.862 E-6 | 4.923 E-6 | 9.827 E-7 | 8.866 E-6 |
| 13 | 7.542 E-6 | 5.904 E-6 | 1.965 E-6 | 8.862 E-6 |
| 14 | 7.562 E-6 | 5.93 E-6 | 1.964 E-6 | 9.923 E-6 |
| 15 | 7.882 E-6 | 4.924 E-6 | 2.087 E-6 | 9.419 E-6 |

One of the more important results to be noted from Table 2 is that the theoretically calculated MER falls within the 95% confidence interval of the corresponding simulation in almost all cases. This confirms the validity of the developed traffic model of the present invention. For the three cases that this is not true (e.g., 1, 6, and 8 retransmissions), it is just outside the upper limit of the corresponding confidence interval such that the theoretical model slightly overestimates the MER in these instances (e.g., the deviation from the upper limit of the confidence interval is never greater than about 12%). This is not of a particular concern, and is likely due to the fact that the simulations are only one order of magnitude larger than minimally required.

Figure 4:
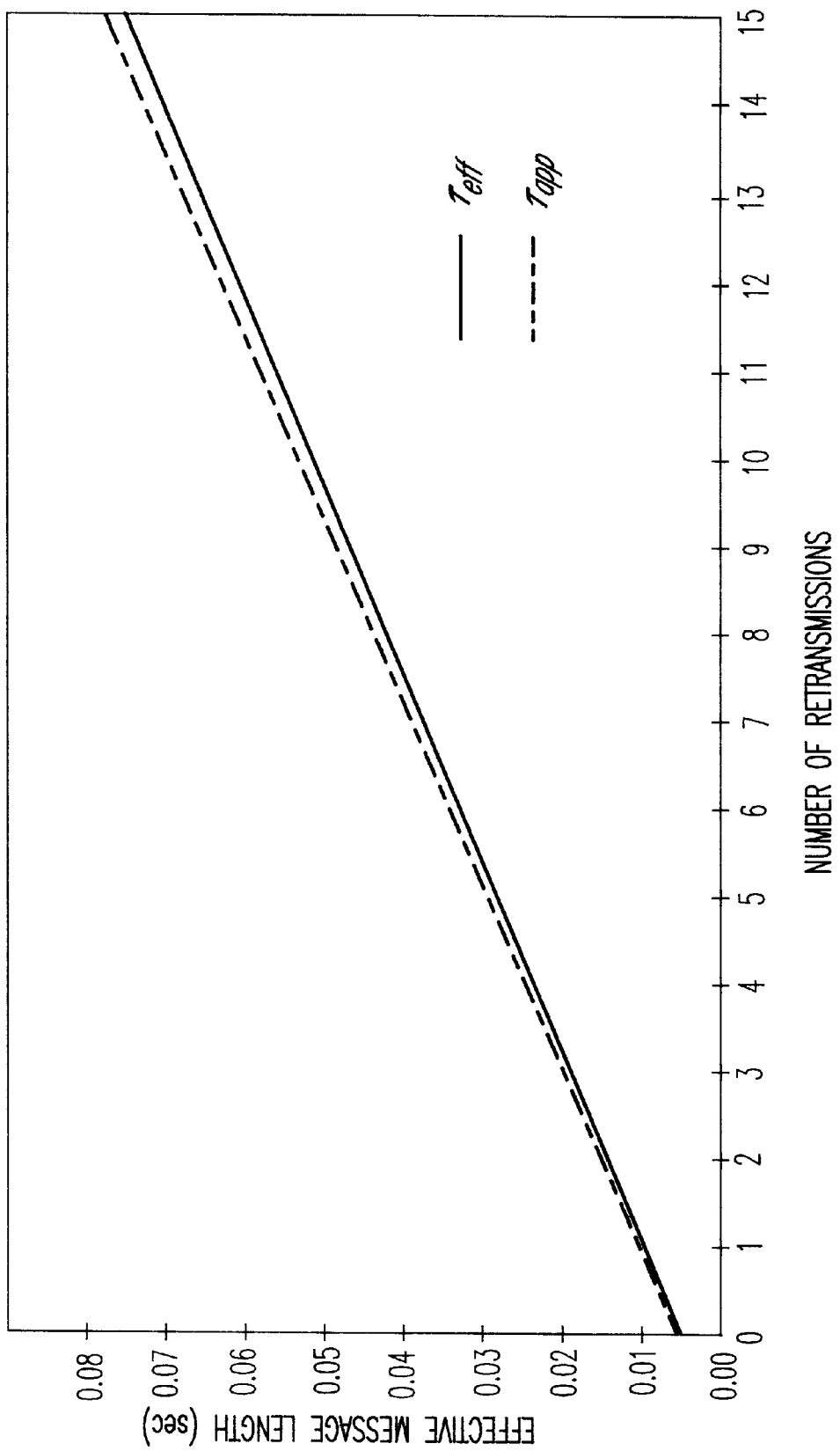
FIG. 4 is a graph of effective message length versus the number of retransmissions for arrival rate of 1 message/sec.

FIG. 4 shows both $\tau_{eff}$ from expression (18) and the first term of expression (18) $E+1)\tau=\tau_{app}$, as functions of the number of retransmissions E for original message arrival rate of 1 message/sec. Upon closer examination of FIG. 4, it is clear that the second term in expression (18) has a small contribution given any practical number of retransmissions and expected arrival rates. Thus, for any practically realizable small number of retransmissions, the effective message length $\tau_{eff}$ can be approximated by $$\tau_{eff}=(E+1)\tau. \quad (19)$$

Using expression (19) in expression (17) leads to the simplified expression for the probability of successful transmission of a given message:

$$P = 1 - \left[(1 - e^{-2\lambda N(E+1)\tau}) + (1 - e^{-\lambda NT}) \times \left(1 - \left(1 - \frac{2E\tau}{T - E\tau}\right)^{-2\lambda N(E+l)\tau}\right)^{E+l}\right] \quad (20)$$

which is especially applicable to channels with a small number of retransmissions. It should further be noted that if no retransmissions occur (e.g., E=0), $\tau_{eff}$ in expression (18) becomes simply $\tau$, and the expression (17) or the probability of successful message transmission becomes $e^{-2\lambda NT}$. This is the probability of no Poisson arrivals during the collision window $2\tau$.

EXAMPLE INVENTIVE METHOD AND APPARATUS OF THE PRESENT INVENTION

The invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine capable of implementing the flow charts shown in the figures can be used as a controller with the invention.

Referring now to FIG. 5, a system overview of an example of the present invention is shown. Specifically, a plurality of television units 10 are linked to a decoder (e.g., audio link) 15 and a remote control 17. The audio link 15 is linked to a cell repeater 20 which, in turn, is linked to a host system 30. The link to the host computer 30 from the cell repeater 20 may be provided via (i) Internet, (ii) cable modem, (iii) CDPD, (iv) phone or the like. In preferred embodiments, a television advertiser is linked to the host computer 30 and receives a signal from any of the audio links 15 such that a viewer of the television advertisement can order merchandise from the advertiser directly from any of the television units. The host system 30 runs the software of the present invention.

Specifically, in order to use the method and apparatus of the present invention, an advertiser is assigned a code which is placed in an audio signal of a commercial advertisement or program. The code may be computer bits which are "hidden" in the audio portion of a television signal such that the code is not noticeable to the television viewer, but the method and apparatus of the present invention will recognize these bits and will provide command actions to the television. These actions may include, but are not limited to:

Press a key for more information

Press at key for a coupon

Press a key for more information

Press a key for ordering merchandise.

When the viewer presses a particular key (on any television unit 10 remote control), a message to the repeater 20 via a radio channel or other communication link is delivered. This message may include the audio code, consumer ID and other important information, and may be stored in a data field in the repeater 20. The repeater 20 then connects with the host system 30 and sends a message that contains, for example, (i) the consumer ID, (ii) audio code, (iii) button pushed, (iv) time stamp, and (v) location (latitude and longitude). The host system 30 then takes action specified when the audio code is assigned. This action may include, for example, sending (i) email to the advertiser or company, (ii) a FAX (iii) a computer file or (iv) any other action agreed upon when the audio code number is assigned to the advertiser.

Hardware

As seen in FIG. 5, the system of the present invention includes three hardware components. These components include the host system 30, the cell repeater 20 and the audio link 15. The host system 30 may be any computer running the host software, and will not be described in detail herein

Decoder (E.g., Audio Link)

The decoder (e.g., audio link) 15 may be a setup box that detects hidden messages in the audio signal of television programming. The audio link 15 can respond to these messages in several ways such as, for example, Speak preprogrammed sentences such as "Please enter a PIN number".

Detect user responses entered via an Infrared remote control.

Send a radio message, preferably 900 MHZ band to the repeater 20.

The audio link 15 may transmit to the repeater 20 over one of four frequencies located in the unlicenced 900 MHZ ISM band. Thus, the audio link 15 does not receive any confirmation that a transmitted message was received from either the repeater 20 or the host system 30.

However, to improve the probability that a message was received by the repeater 20, multiple messages are sent over a transmission interval in accordance with the above discussion. That is, using the above model, the present method and apparatus predicts the communications channel error rate as a function of message length, new message rate, number of retransmissions, and retransmission interval in order to ensure that there is no message collision. It is well understood that each audio link 15 has a unique serial number such as, for example, a 32 bit number.

Repeater

The cell repeater 20 of the present invention collects data messages (preferably 900 MHZ) from audio links 15 located within a service area. This service area can be of various sizes; however, in preferred embodiments, the service area is 1000 homes with an expected population around a 550 meter radius and routed through the Internet to a server using either a physical or Cellular Digital Package Data or a standard telephone line. The general specifications of the repeater are preferably, Input Power: 110 Vac 160 Watts
RF Bandwidth: 902–928 MHZ
RF Sensitivity: –100 dBm
GPS Rec & Antenna and RF Antenna: Built-in
Phone Line: Up to 56 k bps The repeater 20 further includes three major components: (i) a Main Frame, (ii) a Decoder, and (ii) a Radio. In preferred embodiments, the Repeater Main Frame is manufactured by Grayson Wireless of Forest Virginia, and is built around a "Wireless Measurement Instrument" (WMI). Preferably, a Motorola 68305 processor controls the WMI functions which accommodates four radios, where each radio receives signals on a different frequency and is connected to a Decoder Board. The Decoder Boards receive the baseband signal from the radio and process the incoming messages. Of course, other well known hardware systems can be equally used with the method and apparatus of the present invention.

The repeater 20 detects and accepts wireless data (messages) from the audio link 15 and sends the messages to the host computer 30 for processing. Since there is no way for the repeater 20 to acknowledge reception of a message to the audio link 15, the probability of reception of the messages by the repeater is increased by sending each message several times in accordance with the above discussion, for example, eleven times, using one of preferably four different frequencies for each transmission. The repeater 20 recognizes these duplicate messages and discards all but one of them. In order to insure that corrupted messages are ignored by the repeater 20, the audio link 15 appends a CRC (cyclic redundancy code) to the message. The repeater 20 then checks the message against the CRC and ignores the messages whose imbedded CRC does not match the CRC calculated from the rest of the message.

FIG. 6 shows a functional diagram of the repeater 15 and related systems. Specifically, and as discussed above, the audio link 15 is linked to the repeater 20 via a wireless communication path. The repeater 20 is linked to the host computer 30 via a digital path. The digital data path between the repeater 20 and the host computer 30 is intentionally left undefined at this point and may include a serial link, serial link with modems, Ethernet, ISDN, etc. When the system is fielded, there will be many audio links 15 sending messages to each repeater 20.

Wireless Message Format

The message sent by the audio link 15 to the repeater is simply a stream of 184 bits (23 bytes). However, other stream lengths are also contemplated for use with the present invention. The 184 stream bit message may include the following format:

| Number of Bits | Information |
| --- | --- |
| 24 bits | Lock bits |
| 8 bits | Header |
| 32 bits | Product ID |
| 32 bits | audio link Serial No. |
| 32 bits | Data |
| 16 bits | CRC |
| 40 bits | Not Used |

When the repeater 20 receives a message from the audio link 15, a certain time period is required for the repeaters 20 automatic gain control to stabilize. This time is not constant and, therefore, an unknown number of bits at the beginning of the message are lost.

In embodiments, the initial 24 bits in the message, called lock bits, contain no useful data and exists only to allow the receiver in the repeater 20 to detect the start of the message. The lock bits may be, for example, 000011110000111100001111. The header bits may be, for example, 001100111, and simply signal the start of the message. Since the receiver cannot determine how many, if any, of the lock bits were lost, it has to look for the header bit pattern to determine the start of the actual message.

Priority Levels

In preferred embodiments, there are 8 priority levels for a message, numbered 0 to 7. Priority 0 is the lowest (east important) priority, and priority 7 is the highest (most important) priority. When the repeater 20 sends messages to the host computer 30, it always sends higher priority messages before sending lower priority messages. Also, within a given priority, messages are sent to the host in a FIFO (first in, first out) manner. Moreover, the priority of a message determines the maximum latency time of the message (i.e., the maximum amount of time that the message will be retained in the repeater's 15 memory before being sent to the host computer 30).

In order to maintain efficient communication with the host computer 20, the repeater 20 may allow a certain number of messages to accumulate in its memory before packaging them into a packet to be sent to the host computer 30. During low traffic use, this process may allow messages to remain in the repeater 20 memory for long periods of time. Thus, if any message remains in the repeater 20 memory longer than its priority dependent maximum latency time, it will be sent to the host computer 30. In embodiments, messages with priority 7 have a maximum latency time of zero (i.e., they are sent immediately, possibly with other lower priority messages to the host computer 30).

Computation of CRC

The CRC is computed from the rest of the message (not including the lock bits and header) in such a way that if the message becomes corrupted, it is highly unlikely that a second CRC computed from the message, using the same algorithm, will match the imbedded CRC. In this way, almost all corrupted messages can be detected and eliminated.

Repeater Hardware Layout

Figure 7:
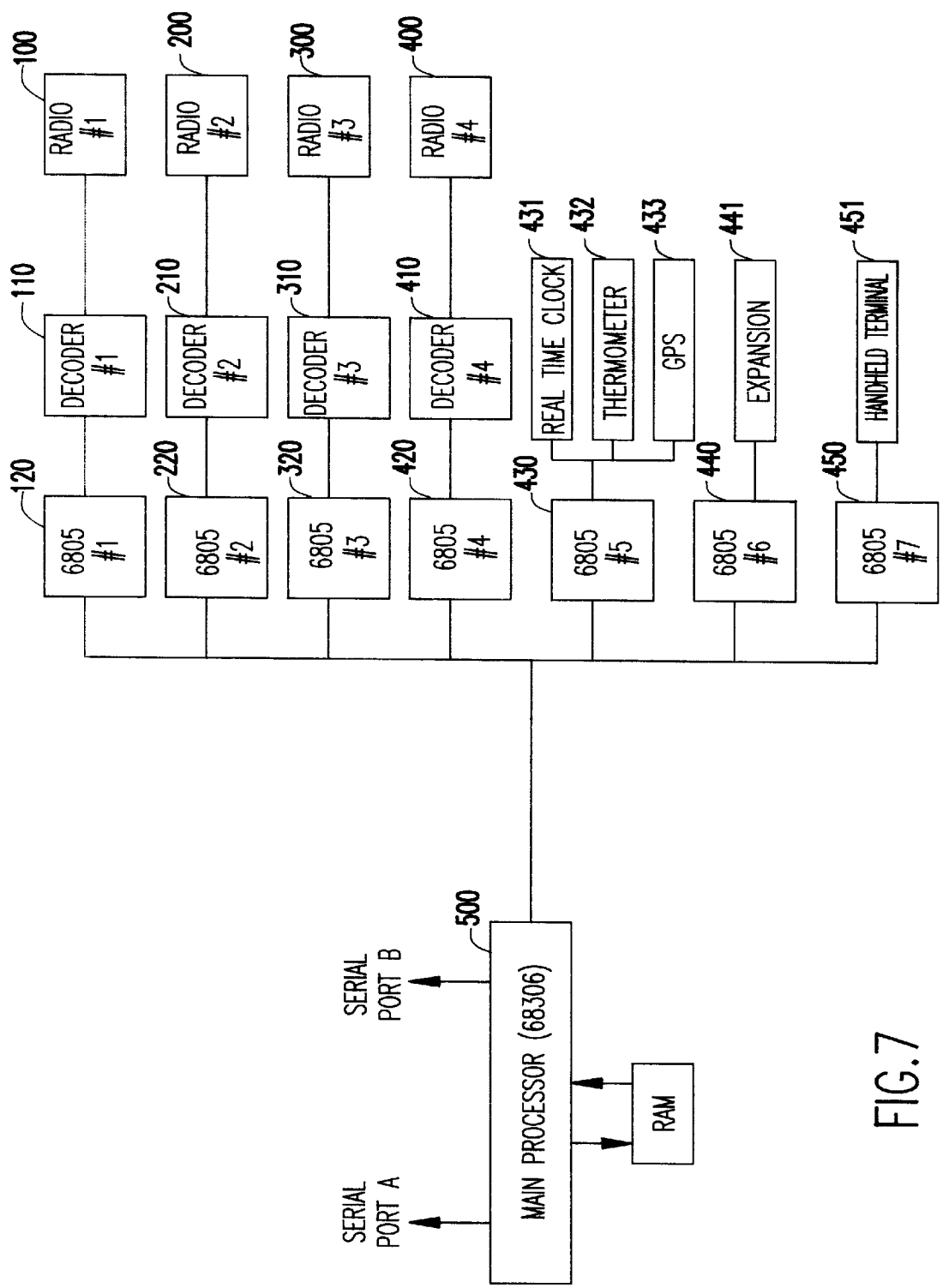
FIG. 7 shows a hardware layer of the repeater of one embodiment of the present invention.

FIG. 7 shows a hardware layer of the repeater 20 of one embodiment. The messages sent by the audio link 20 are first received by one of the four radios 100, 200, 300, 400, depending on the radio frequency of the message. The received signals are then sent to respective decoders 110, 210, 310, 410, where the signals are digitized and stored. Additionally, in embodiments, microprocessors 430, 440, 450 are also present. Microprocessor 430 receives data from a realtime clock 431, a thermometer 432 and a Global Positioning System (GPS) 433. Microprocessors 440, 450 receive data from an expansion module 441 (e.g., an open slot for future development) and a handheld terminal 451.

The microprocessors 120, 220, 320, 420, 430, 440, 450 exist only to transfer data between the respective decoders 110, 210, 310, 410 (and other attached devices) and the main processor 500. Each of the microprocessors 120, 220, 320, 420, 430, 440, 450 have preferably 32 bytes of memory; however, each of the microprocessors 120, 220, 320, 420, 430, 440, 450 may have 64, 128, 256, etc bytes of memory. When each of the microprocessors 120, 220, 320, 420, 430, 440, 450 have 32 bytes of memory, the main processor 500 reads the data received by the microprocessors 120, 220, 320, 420 from the decoders 110, 210, 310, 410 in a timely manner (i.e., faster than it is sent to the microprocessors 120, 220, 320, 420, from the decoders 110, 210, 310, 410). This is accomplished by having an interrupt routine read data from the microprocessors 120, 220, 320, 420 placing the data into a large input buffer. The interrupt is generated preferably every 50 milliseconds.

Further, communication between each microprocessor 120, 220, 320, 420, 430, 440, 450 and the main processor 500 is performed in units of messages (which may be of any length). Therefore, some indication of the start and end of each message must be transmitted. In the repeater 30, this is accomplished by sending an ETX (ASCII 02) character at the start of each message, and an EOT (ASCII 04) character at the end of each message. Furthermore, when one processor reads a character from another processor, it may be the case that no data is available at that time such that the inter-processor communication protocol requires sending an ETX (ASCII 03) character. Additionally, if an error is detected by the microprocessor 120, 220, 320, 420, 430, 440, 450 it will transmit an ENO (ASCII 05) character, followed by an error number.

It is possible, however, that one of these special characters exists within the message itself. To ensure that bytes within the message are not interrupted as a special character, they must be "escaped". This is accomplished by transmitting a NUL (ASCII 00) character before any message byte that might otherwise be incorrectly interpreted as a special character. Of course, this makes a NUL byte a special character itself, and therefore a NUL byte within a message must also be escaped. The special characters, which must be escaped when they occur within a message, are summarized in the following table.

| Character | ASCII# | Meaning |
|---|---|---|
| NUL | 00 | The next byte is literal data |
| STX | 02 | Start of Message |
| ETX | 03 | Not ready, buffer empty, try again |
| EOT | 04 | End of message |
| ENQ | 05 | Error occurred, next byte is an error code |

The possible error codes following an ENQ character are as follows:

| Hex | Decima | Meaning |
|---|---|---|
| 0×41 | 65 | Serial input overflowed buffer |
| 0×42 | 66 | Bad command received |
| 0×43 | 67 | Processors' buffer overflow |
| 0×45 | 69 | Main process changed direction unexpectedly |
| 0×46 | 70 | CPU cannot perform requested command |
| 0×47 | 71 | First character in block is not an STX |

When a message arrives at the microprocessors 120, 220, 320, 420, 430, 440, 450, the message includes, preferably, 19 bytes (the lock bits and header have been stripped off). This assumes, however, that none of these 19 bytes are one of the special characters. In the worst case, all 19 bytes may be special characters, in which case each of the 19 bytes is preceded by an extra NUL byte. This would make the message 36 bytes long, and some bytes would be lost because only when the microprocessors 120, 220, 320, 420, 430, 440, 450 have only 32 bytes of memory. Thus, in order to solve this problem, one must ensure that at most 13 of the bytes in the message are special characters.

Repeater Data Structures

The most important data structures maintained by the repeater software are the Priority Queues and the History Queues. There is one Priority Queue for each possible priority level 0–7, and one History Queue for each possible priority level. Each queue holds zero or more nodes (e.g., a node contains a message, a time stamp, and some queue maintenance data) which are accessed in a FIFO (first in, first out) manner. That is, when a node is removed from a queue, that node will be the node that was the earliest node placed in the queue (enqueued).

It is well understood that there is a pool of available nodes in a free node list such that when a new message arrives, after a series of validity checks, the message is placed in one of the Priority Queues. More specifically, when a blank node is obtained from the free list, the message is copied into the new node and the node is placed into (enqueued) the appropriate Priority Queue.

Queued messages are sent to the host computer 30 in a message set. To reduce communication overhead, it is more efficient to send a series of messages at one time, where the most efficient number of messages is dependent on the method of communicating between the repeater 20 and the host computer 30. Therefore, an interface (set of C functions) which must be included in any set of functions implementing a communication method between the repeater 20 and the host computer 30 is defined. For example, one of these functions is named "preferred num_messages()", which returns the preferred number of messages to include in a message set. The functions which may be provided are:

int preferred_num_messages();
    boolean ready_to_send();
    boolean start_message_set();
    boolean append_message(byte *msg);
    boolean send_message_set();
    char *send_error_msg();

There are three criteria, any of which will trigger the sending of a message set.

1. The preferred number of messages exist in the Priority Queues.
2. There is at least one message in Priority Queue 7.
3. One of the Priority Queues 0 thru 6 contains a message older than the maximum delay time for that priority.

For each priority from 0 thru 6, there is a maximum delay time which is the maximum amount of time that messages will be stored in the corresponding Priority Queue before being sent, even though there are fewer than the preferred number of messages in the Priority Queues. This prevents the undesirable situation where, during times of low message input, a message remains in the Priority Queues for a very long time.

In addition to the above criteria, messages cannot be sent if the system for communicating with the host computer 30 is not ready to send the messages. Therefore, even when the above criteria are met, a call is made to the "ready_to_send()" function (see above interface). If the sending system is not ready to send, then the sending is delayed until the messages can be sent. Periodically, the repeater 20 generates a status message which is generated entirely within the repeater 20, but is sent to the Host Computer. This message may contain status information about the repeater 20 and its data structures.

In preferred embodiments, the main processing loop of the repeater software executes as follows.

repeat forever {
      update the system clock while a valid, non-duplicate message exists in the input buffer {get the message from the input buffer get a new node from the free list copy the message into the new node time stamp the node with the current time place the node into the appropriate Priority Queue }
      if it is time to send out a message set {
        for the number of messages to be sent {dequeue a node from its Priority Queue pass a copy of the message to the output system if the node has timed out put the node back into the free list
        else
        put the node into the appropriate History Queue }
      {if it is time to send out a status message
      send out a status message
      remove any timed out messages from the History Queues.

Host Computer Software

The principle functions of the host Software of the present invention are preferably:

1. To process messages received at the serial port from the cell repeater 20; and
2. Optionally, to process messages received at the second serial port from, for example, a Game Computer.

The Host Software can be run in one of two input modes, e.g., using a modem and direct serial line mode. Normally, the present invention can auto detect whether a modem is connected. For example, the present invention issues a reset command to the modem. If the modem is not present (or if the modem is not responding), the Host Software of the present invention may display a dialog box indicating that no modem is detected. At that point the Host Software of the present invention is operating in direct serial line mode.

When the repeater 20 has one or more messages to send, it executes the following functions:

If it is in modem mode, it commands the attached modem to dial the phone number of the host computer's modem.
    Once communication is established, it sends one or more messages as ASCII hexadecimal characters with each message terminated by white space (one or more space, tab, return, an/or newline characters).
    It then sends a hang up command, which may, in embodiments, consist of the two ASCII characters "02", terminated by white space. It is left up to the host software to hang up the line.

If the repeater 20 is in direct serial line mode, the messages are just sent over the serial line (in the format just described) and no "hang up" command is sent.

Types of Messages Received by the Host Software

Messages from the repeater 20 include hexadecimal ASCII characters which are separated by white space (one or more blanks, tabs, carriage returns, and/or newlines, etc). In preferred embodiment, the Host Software of the present invention can receive three types of messages at the serial port.

1. Messages originating from the audio link 15, and which are passed from the repeater 20 to the Host Software of the host computer 30.
2. Hang Up messages from the repeater 20. When the repeater 20 sends the last of a series of messages, it may send a hang up command, consisting of the ASCU string "02". In response, the Host Software instructs the modem to hang up the phone line.
3. A numeric result code from the modem. These result codes are transmitted by the modem in response to various modem commands sent by the Host Software.

The Message List

When the Host Software is first started, message processing is disabled and incoming messages are placed in the message list. Messages in the message list are displayed on-screen in a scrolling list, preferably one message per line. It is possible to select which fields in a message are displayed on screen using a "Fields" menu item in a "view" menu. The names of the currently displayed fields are displayed on the screen of the television. Message processing can be enabled using a "Process Messages" command in a "Debug" menu. When message processing is enabled, valid messages are processed, resulting in various databases and text files being updated which may or may not be displayed on-screen. Messages which have a valid format (all messages are CRC checked and discarded if the CRC does not match), but whose content is invalid are still placed into the message list and displayed on-screen. Messages may have invalid content due to the following:

1 The audio link 15 serial number in the message does not match any serial number in the audio link 15 database
2. There is no consumer name associated with that audio link 15.
3. The Product ID in the message does not match any Product ID in the Product ID database.
4. The How To Handle field does not contain a valid entry.

Databases

In the system of the present invention there are two databases (although other databases may also be used with the present invention) which are stored as Paradox database files. In preferred embodiments, the data base files are manipulated by the Host Software via a Borland Database Engine (BDE). The two preferred databases include:

1. The Audio link 15 database which contains one record for each audio link 15 device.
2. The Product ID database which contains one record for each type of message originating from an audio link 15 which may be received by the Host Software of the host computer 30. The Product ID identifies the particular application, e.g. a particular commercial, poll, product coupon, etc.

The audio link 15 database may contain several fields such as, for example:

Audio link ID—the Audio link is an imbedded silicon serial number.

Serial Number.

Consumer Name.

Location of consumer, including Street Address, City/State/Zip.

Delivery Method.

Consumers Phone Number.

PIN Number—to be used for purchasing products, etc.

Persona—alternate name—intended for use in game playing.

Last Powerup.

Chan0—number of "power on" messages received over channel 0.

Chan1—number of "power on" messages received over channel 1.

Chan2—number of "power on" messages received over channel 2.

Chan3—number of "power on" messages received over channel 3.

The Product ID database may also contain several fields, for example:

Product ID

Command #—extracted from message

Handler #—indicates how messages with this Product ID should be handled. For example, output consumer into to a file (filename specified in next field), increment the "count" field in this record.

Filename—filename to output consumer info to when consumer requests more information, a coupon etc.

Entries—total number of entries in the file.

Entries Printed—number of entries in the file which have been printed out.

Copies Allowed—number of coupons, information packets, etc. that a single consumer is allowed to request.

Customer Name—name of company or organization sponsoring this product.

Count—field to increment if Handler # is 2.

Audio Signaling

A perfecting preferred feature of the present invention further includes a method of encoding a digital signature onto the audio component of a television (or radio) signal. This perfecting feature includes a digital signature of about 35 bits in length and nearly inaudible to human observers yet detectable by the decoder (e.g., audio link 15). The encoding scheme used with the present invention is robust against most extraneous noises as well as the "wow" and "flutter" of video tape machines.

System Description

After considering various approaches including options based on audio frequency spread spectrum and differential phase shift keying, a hybrid technique similar to amplitude-shift keying (ASK) and frequency-shift keying (FSK) is used with the present invention. The digital signature is encoded uses 167 sinusoids added to a filtered version of the audio component of the television signal.

In order to make the signature as inaudible as possible, psycho acoustic masking properties are employed. The signature is of short time duration and has a low amplitude relative to the local audio. Furthermore, the sinusoidal frequencies are chosen to be in the range from 2.4 to 6.4 kHz, where human sensitivity declines compared to its peak around 1 kHz. This frequency range also allows the signature to be placed where strong low frequency content is present in the audio signal to help mask the weaker high frequency sinusoids. Using frequencies above 2.4 kHz also provides some resistance to human voice interference at the receiver. Of course, the audio component of a television signal is not bandlimited to 6.4 kHz, and frequencies above this could have been used to take advantage of further reduction in human sensitivity. However, in preferred embodiments, it is desirable to keep the sampling rate of the decoder as low as possible because of computational requirements. Once the target location within the audio signal is chosen, a zero-phase lowpass filter is used to remove any frequency content above 2.4 kHz. The sinusoids are then added to the signal.

Figure 8:
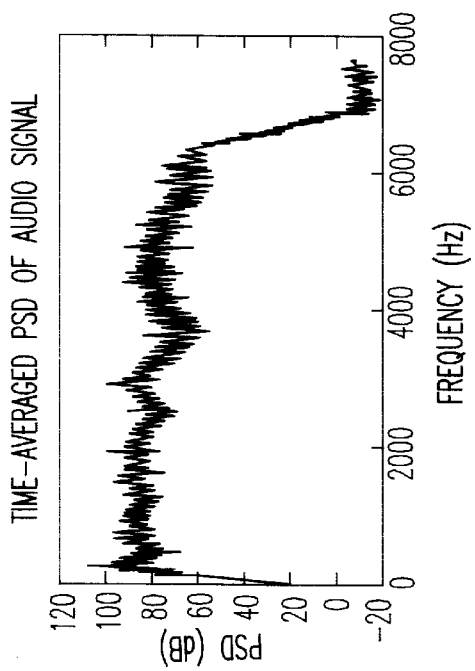
FIG. 8 shows a time-averaged power spectral density (PSD) of a typical window of audio signal.
Figure 9:
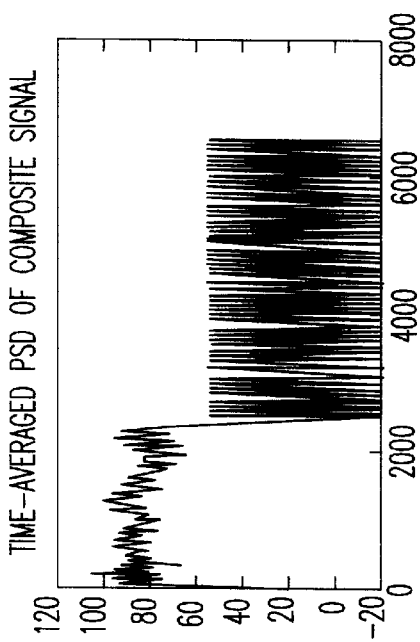
FIG. 9 shows a time averaged power spectral density of a composite signal.

FIG. 8 shows the time-averaged power spectral density (PSD) of a typical window of audio signal. Specifically, FIG. 8 shows the power as a function of the frequency of an audio signal. FIG. 9 shows the time averaged power spectral density of a composite signal. The composite signal is the signal of FIG. 8 after lowpass filtering and addition of the sinusoids. The frequencies of the 167 sinusoids are chosen to correspond with bin frequencies of preferably a 4096 point FFT (fast Fourier transforms) performed on data sampled at a rate of 16.0 kHz. Thus, the decoder can use a simple FFT to detect the presence of the sinusoids. The magnitude estimate at each candidate FFT bin is compared with neighboring bins two away on each side to determine whether a sinusoid is present. If the neighbor FFT values are below the center value by at least 4 dB then a sinusoid is assumed to be present and a digital "1" is indicated. If this condition is not satisfied, a digital "0" is indicated.

Figure 10:
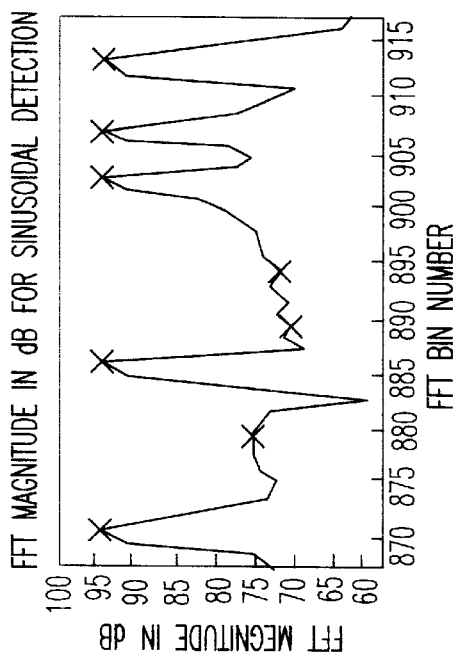
FIG. 10 shows the FFT magnitude in dB for sinusoidal detection.

FIG. 10 shows the detection process, and more specifically the FFT magnitude in dB for sinusoidal detection. The asterisks mark the candidate FFT bins and the circles mark the bins two away on either side of the centers. The bit sequence [10100111] is represented in the example of FIG. 10. Because interference due to sidelobe leakage can be a problem with closely packed sinusoids, a Hanning window is applied before the FFT is computed. The mainlobe width of the Hanning window dictates that the sinusoids be spaced at least six FFT bins span apart, and also requires that the examination of the neighbor bins two away on each side rather than the immediate neighbors a single bin away.

When detecting the presence of the sinusoids, calculating the true magnitude spectrum is not possible due to the computational burden imposed by the square-root operation.

Also, the alternative of using the magnitude squared spectrum created dynamic range problems when implemented with 16-bit wordlength. A solution was found by computing an estimate of the magnitude spectrum by calculating the maximum of the absolute values of the real and imaginary pans for each FFT bin. Simulations show that performance is only slightly degraded by substituting this magnitude estimate.

The 167 sinusoids used in coding the digital signature perform several functions. Since many sinusoids can be attenuated due to transmission losses, multipath effects, and noise interference, redundancy and error correction techniques are necessary. For example, the digital signature itself is 35 bits in length, and for error detection purposes, a cyclic redundancy check of 12 bits is added. These 47 bits are then repeated in a triplication code to provide double redundancy, bringing the total to 141 bits. The three blocks in the triplication code occur in distinct frequency regions between 2.4 and 6.4 kHz. Thus, if attenuation occurs for any of the above-stated reasons in a single frequency band, the data bit patterns are still detectable due to the double redundancy present in the other bands.

Five sinusoids are used for frequency shift detection. The final subset of 21 sinusoids is used solely for self-synchronization. If a two-thirds majority of these "control" sinusoids is detected, valid data is considered to be present.

Figure 11:
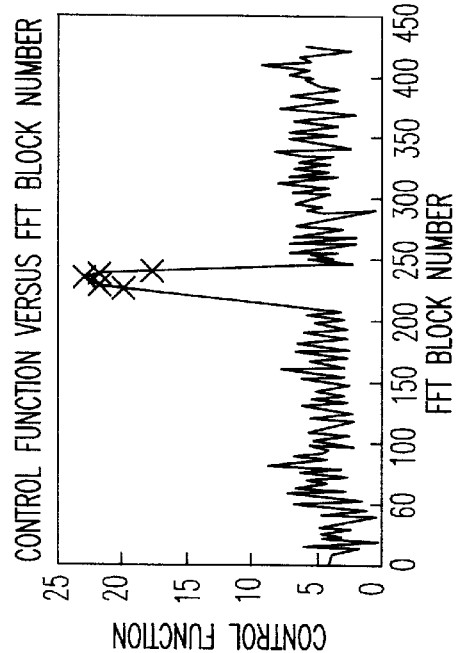
FIG. 11 shows the control function versus FFT block number.

Referring now to FIG. 11, self-synchronization with the control function is shown. More specifically, FIG. 11 shows the control function versus FFT block number. As the FFTs are performed on blocks of signals, the 21 control sinusoid locations are examined. If sinusoids are detected at 14 or more of these locations, valid data is assumed to be present in that FFT block, and the data sinusoid locations can be polled. In FIG. 11, the asterisks indicate when a two thirds majority of control sinusoids is present, and hence when the digital data is available.

As seen, the control sinusoids are uniformly interspersed with the data sinusoids throughout the entire 4 kHz band. Thus, the control sinusoids not only serve a synchronization purpose, but they also provide an indication of the quality of the received data in that particular FFT block. Since a triplication code is being used for the data, a two-thirds majority for the control function is appropriate. Furthermore, when the data is being tabulated over successive FFT blocks, the results of each block are weighted according to the value of the control function in that black. For example, more confidence in the data is obtained when the control function is 21/21 versus 14/21. The data associated with such blocks should be weighted accordingly. Thus, digital "1"s are represented by positive control function values and digital "0" s by negative control function values.

Once the detection process is initiated by the control function, valid data received in the current and subsequent FFT blocks are tabulated. The end of data transmission is detected by the level of the control function dropping below 14/21 and remaining low for a specified period of time. When it is determined that the data transmission is complete, final decisions are made regarding the individual data bits. Since the bit votes from each FFT block (weighted by the control function from each block) are summed over time, a final decision is made regarding each bits status by a simple threshold test. Thus, as previously discussed, a digital "1" represents a positive bit value and a digital "0" represents a negative bit value. The triplication code is then decoded by a two-thirds majority vote among the three frequency sub-bands. Finally, the CRC is checked to verify error free reception resulting in the 35 bit digital signature.

Table 3 demonstrates the data decoding process (without the CRC) through an example. That is, suppose a user desires to transmit a digital signature of two bits [1 0], and on the decoding end the control function is detected as shown in Table 3. When the control function is below 14 no data is present; however, when the control function is 14 or larger the data bit locations are analyzed to determine if sinusoids are present. When a sinusoid is present, the value of the control function is added to the corresponding data bit location. Similarly, the lack of a sinusoid represents a digital zero, and the value of the control function is subtracted from the corresponding data bit location. Once the control function drops below 14 and stays there, the data collection process terminates. Any bit locations containing positive values are considered to be a digital "1" and any negative locations are a digital "0".

TABLE 3

| FFT Block | Control Function | Bit 1-1 | Bit 2-1 | Bit 1-2 | Bit 2-2 | Bit 1-3 | Bit 2-3 |
| --- | --- | --- | --- | --- | --- | --- | --- |
| 1 | 4 | 0 | 0 | 0 | 0 | 0 | 0 |
| 2 | 3 | 0 | 0 | 0 | 0 | 0 | 0 |
| 3 | 14 | 14 | −14 | 14 | −14 | −14 | −14 |
| 4 | 18 | 18 | −18 | 18 | −18 | −18 | −18 |
| 5 | 21 | 21 | −21 | 21 | −21 | 21 | −21 |
| 6 | 20 | 20 | 40 | 20 | −20 | 20 | −20 |
| 7 | 16 | −16 | −16 | 16 | −16 | −16 | −16 |
| 8 | 13 | 0 | 0 | 0 | 0 | 0 | 0 |
| 9 | 7 | 0 | 0 | 0 | 0 | 0 | 0 |
| 10 | 2 | 0 | 0 | 0 | 0 | 0 | 0 |
| Final Value | | 57 | −89 | 89 | −89 | −7 | −89 |
| Digital Value | | 1 | 0 | 1 | 0 | 0 | 0 |

Note that Bit 1—1 contains an error during FFT block 7. However, the correct value is received often and strong enough in other FFT blocks to produce the correct bit decision at the end. Bit 1–3,however, was corrupted several times (in FFT blocks 3,4, and 7). Multipath interference can cause a null in the frequency domain resulting in such a repeating bit error. In this case, the bit decision is incorrectly made a "0"; however, the proper digital signature will still be extracted due to the redundancy of the triplication code. The values for Bit 1 are [110] yielding a "1". Similarly the values for Bit 2 are [0 0 0] yielding a "0".

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for avoiding signal collision of messages transmitted over a single channel, comprising:

transmitting messages over a single channel;

randomly retransmitting the messages over the single channel;

determining a retransmission interval between the retransmitted messages;

determining a message rate and message length of the messages; and predicting an error rate of the messages as a function of the message length and rate, and the retransmission interval and number of retransmissions of the messages.

2. The method of claim 1, wherein an arrival rate of each message is independent of arrivals in previous or future messages.

3. The method of claim 1, further comprising determining subintervals of an end of an original message transmission of each message and an end of a final randomly retransmitted message and wherein each retransmission occurs at any time within a respective subinterval.

4. The method of claim 3, where the subintervals are identical subintervals.

5. The method of claim 4, wherein a new message retransmission will not occur prior to a start of a next subinterval.

6. The method of claim 1, further comprising determining a fixed value for the message length and the retransmission interval in order to determine the optimal number of retransmissions for all arrival rates of each of the messages on the single channel.

7. The method of claim 6, further comprising:
calculating an effective collision parameter for a given rate and number of retransmissions; and
determining the probability of successful message transmission for a specified number of retransmissions and a given rate of initial message arrivals as a function of the effective collision parameter.

8. The method of claim 7, wherein the effective collision parameter is a function of (i) an introduction of retransmissions of the messages into the single channel and (ii) an interdependency of initial message generation and message retransmission.

9. The method of claim 1, wherein at any given time the messages are transmitted and retransmitted over the single channel.

10. The method of claim 1, wherein each transmitted and retransmitted message encounters identical conditions on the single channel.

11. The method of claim 1, wherein the messages are transmitted via (i) Internet, (ii) cable modem, (iii) CDPD or (iv) phone.

12. The method of claim 1, wherein the transmitted messages are responsive to a code placed in an audio portion of a television message.

13. The method of claim 12, further including hiding the code in the audio portion such that the code is not noticeable to television viewers.

14. The method of claim 12, wherein the transmitted messages are broadcast over at least one frequency.

15. The method of claim 14, wherein the transmitted messages are broadcast over four frequencies in a range of approximately 900 MHZ.

16. The method of claim 12, wherein the transmitted messages include a cyclic redundancy code (CRC).

17. The method of claim 16, further comprising:
receiving the transmitted messages including the CRC via a receiver; and
checking the transmitted messages against the CRC and ignoring the messages whose CRC does not match a CRC calculated from a remaining portion of the messages.

18. The method of claim 1, further comprising:
encoding the message as a digital signature;
filtering the digital signature so that the messages are inaudible;
appending the digital signature onto an audio message.

19. The method of claim 18, wherein the encoding the message includes psycho acoustic masking such that the digital signature includes a short time duration and a low amplitude relative to a local audio message.

20. The method of claim 18, wherein the digital signature is chosen to be in the range from approximately 2.4 to 6.4 kHz.

21. The method of claim further comprising placing the digital signature in a strong low frequency content in the audio message in order to mask weaker high frequency sinusoids.

22. The method of claim 18, wherein the digital signature is repeated in a triplication code to provide double redundancy.

23. The method of claim 12, wherein the code is assigned to a television advertiser which receives the messages which include ordering information.

24. The method of claim 1, wherein the messages include a stream of bits including a CRC and at least one of a header, lock bits and data.

25. The method of claim 24, wherein the lock bits allow a receiver to detect a start of the message.

26. The method of claim 1, wherein the messages include priority levels, wherein a higher priority message is transmitted before a lower priority message.

27. The method of claim 26, wherein the priority of the message determines a maximum time the message will be retained in a receiver prior to being transmitted to a host station.

28. The method of claim 27, further comprising accumulating the messages in a memory of the receiver prior to transmitting the messages to the host station.

29. A means for avoiding signal collision of messages transmitted over a single channel, comprising:
means for transmitting and randomly retransmitting messages over a single channel, the transmitting and randomly retransmitting means further determining a retransmission interval between the retransmitted messages, and fixing a message rate and message length of the messages and achieving a desired error rate as function of the message length and rate, and a number of retransmissions and the retransmission interval of the messages; and
means for receiving the transmitted and randomly retransmitted messages.

30. The means of claim 29, wherein the transmitting and randomly retransmitting means further determines subintervals of an end of an original message transmission of each message and an end of a final randomly retransmitted message.

31. The means of claim 29, wherein the transmitting and randomly retransmitting means further fixes the message length in order to determine an optimal number of retransmissions for all arrival rates of each of the messages of the messages on the single channel.

32. The means of claim 31, further comprising a calculating means for calculating an effective collision parameter for a given message rate and number of retransmissions and determines the probability of successful message transmission for a specified number of retransmissions and a given rate of initial message arrivals as a function of the effective collision parameter.

33. The method of claim 31, further comprising:
means for encoding the message as a digital signature; and
means filtering the digital signature so that the messages are inaudible.

34. The means of claim 31, further comprising destination means for receiving the messages from the receiving means.

35. The means of claim 34, wherein the receiving means further comprises:
means for determining a priority of the messages; and
means for holding a plurality of the messages and transmitting the messages to the destination means in one of (i) order of priority and (ii) first in first out sequence.

36. The means of claim 35, further comprising means for determining whether the receiving means and the destination means are linked via a wireless communication link.

* * * * *